(12) United States Patent
Park

(10) Patent No.: US 11,143,840 B2
(45) Date of Patent: Oct. 12, 2021

(54) LENS DRIVING MOTOR

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 231 days.

(21) Appl. No.: 16/279,452

(22) Filed: Feb. 19, 2019

(65) Prior Publication Data

US 2019/0179104 A1     Jun. 13, 2019

Related U.S. Application Data

(63) Continuation of application No. 15/122,291, filed as application No. PCT/KR2015/001691 on Feb. 23, 2015, now Pat. No. 10,288,835.

(30) Foreign Application Priority Data

Feb. 27, 2014 (KR) .................. 10-2014-0023265
Mar. 4, 2014 (KR) .................. 10-2014-0025518

(51) Int. Cl.
*G02B 7/09* (2021.01)
*H02K 41/035* (2006.01)
(Continued)

(52) U.S. Cl.
CPC ............. *G02B 7/09* (2013.01); *G02B 27/646* (2013.01); *G03B 5/04* (2013.01); *G03B 13/36* (2013.01);
(Continued)

(58) Field of Classification Search
CPC ............. H02K 11/215; H02K 41/0356; G02B 27/646; G03B 5/04; G03B 13/36;
(Continued)

(56) References Cited

U.S. PATENT DOCUMENTS

2004/0207745 A1* 10/2004 Tsuruta ............. H01L 27/14645
                                                                        348/335
2009/0252488 A1   10/2009 Eromaki et al.
(Continued)

FOREIGN PATENT DOCUMENTS

CN             1933303 A         3/2007
JP        2009-282090 A         12/2009
(Continued)

OTHER PUBLICATIONS

International Search Report in International Application No. PCT/KR2015/001691, filed Feb. 23, 2015.
(Continued)

*Primary Examiner* — Joseph P Martinez
*Assistant Examiner* — Vipin Patel
(74) *Attorney, Agent, or Firm* — Saliwanchik, Lloyd & Eisenschenk

(57) ABSTRACT

One embodiment provides a lens driving motor, comprising: a mover including a bobbin for fixing a lens, and magnets disposed on the bobbin; a stator comprising a first coil and a second coil arranged to correspond to the respective magnets, a housing including an upper surface with an open center and a support part having an outer surface on which the first coil is disposed, a base which supports the housing and has a through hole formed in the center thereof to correspond to the lens, and a substrate disposed on an upper surface of the base so as to apply power to the second coil; and a hall sensor disposed at a position facing the magnets so as to sense a phase of the mover.

19 Claims, 10 Drawing Sheets

(51) Int. Cl.
  *H02K 11/215* (2016.01)
  *G02B 27/64* (2006.01)
  *G03B 5/04* (2021.01)
  *G03B 13/36* (2021.01)
  *H04N 5/225* (2006.01)

(52) U.S. Cl.
  CPC ....... *H02K 11/215* (2016.01); *H02K 41/0356* (2013.01); *H04N 5/2252* (2013.01); *H04N 5/2253* (2013.01); *H04N 5/2257* (2013.01); *G03B 2205/0015* (2013.01); *G03B 2205/0069* (2013.01)

(58) Field of Classification Search
  CPC ...... G03B 2205/0015; G03B 2205/006; H04N 5/2252; H04N 5/2253; H04N 5/2257
  See application file for complete search history.

(56) References Cited

U.S. PATENT DOCUMENTS

| | | |
|---|---|---|
| 2010/0149667 A1 | 6/2010 | Wada et al. |
| 2011/0090580 A1 | 4/2011 | Shiraki et al. |
| 2011/0121666 A1 | 5/2011 | Park et al. |
| 2012/0146432 A1 | 6/2012 | Kim et al. |
| 2012/0200176 A1 | 8/2012 | Park |
| 2013/0016428 A1 | 1/2013 | Sugawara et al. |
| 2013/0039640 A1 | 2/2013 | Sekimoto |
| 2013/0120861 A1 | 5/2013 | Park et al. |
| 2013/0215511 A1* | 8/2013 | Wu .................. H04N 5/23287 359/554 |
| 2013/0314792 A1 | 11/2013 | Hu et al. |

FOREIGN PATENT DOCUMENTS

| | | |
|---|---|---|
| JP | 2010-096863 A | 4/2010 |
| JP | 2010-134409 A | 6/2010 |
| JP | 2011-039276 A | 2/2011 |
| JP | 2011-85666 A | 4/2011 |
| JP | 2011-257556 A | 12/2011 |
| JP | 2012-238029 A | 12/2012 |
| JP | 2012-242648 A | 12/2012 |
| JP | 2013-024944 A | 2/2013 |
| JP | 2013-127492 A | 6/2013 |
| JP | 2013-167893 A | 8/2013 |
| JP | 2013-210550 A | 10/2013 |
| JP | 2014-2349 A | 1/2014 |
| KR | 10-2011-0080590 A | 7/2011 |
| KR | 20120045333 A | 5/2012 |
| KR | 10-2012-0065491 A | 6/2012 |
| KR | 10-2012-0090379 A | 8/2012 |
| KR | 10-2013-0077218 A | 7/2013 |
| KR | 20130077215 A | 7/2013 |
| KR | 10-1338562 B1 | 12/2013 |
| KR | 20140003716 A | 1/2014 |
| WO | WO-2013/168898 A1 | 11/2013 |
| WO | WO-2014/010865 A1 | 1/2014 |

OTHER PUBLICATIONS

Supplementary European Search Report dated Oct. 24, 2017 in European Application No. 15754850.4.
Office Action dated May 23, 2018 in Chinese Application No. 201580010931.2.
Office Action dated Mar. 9, 2018 in U.S. Appl. No. 15/122,291.
Office Action dated Jun. 28, 2018 in U.S. Appl. No. 15/122,291.
Office Action dated Oct. 14, 2019 in Korean Application No. 10-2014-0023265.
Office Action dated Feb. 22, 2019 in European Application No. 15 754 850.4.
Office Action dated Feb. 5, 2019 in Japanese Application No. 2016-553653.
Office Action dated Dec. 3, 2020 in Korean Application No. 10-2014-0025518.
Office Action dated Dec. 7, 2020 in Korean Application No. 10-2020-0101920.
Office Action dated Mar. 1, 2021 in Chinese Application No. 201910977849.7.
Office Action dated Jan. 14, 2020 in Japanese Application No. 2016-553653.
Office Action dated Jun. 4, 2020 in Korean Application No. 10-2014-0025518.
Office Action dated Aug. 11, 2021 in Japanese Application No. 2020-108744.

* cited by examiner

LENS DRIVING MOTOR

CROSS-REFERENCE TO RELATED APPLICATIONS

This application is a continuation of U.S. application Ser. No. 15/122,291, filed Aug. 29, 2016; which is the U.S. national stage application of International Patent Application No. PCT/KR2015/001691, filed Feb. 23, 2015; which claims priority to Korean Application Nos. 10-2014-0023265, filed Feb. 27, 2014; and 10-2014-0025518, filed Mar. 4, 2014; the disclosures of each of which are incorporated herein by reference in their entirety.

TECHNICAL FIELD

Exemplary embodiments of the present disclosure relate to a lens driving motor of which structure is improved.

BACKGROUND

Concomitant with wide propagation of various mobile terminals and commercialization of wireless Internet services, demands by consumers on the mobile terminals are diversified, and various types of additional equipment are attached to the mobile terminals.

Among the various types of additional equipment, a camera module may be a representative device capable of editing and transmitting a still image or a moving picture, as necessary, by photographing the still image or the moving picture, and storing the still image or the moving picture in image data.

In recent years, there has been a growing demand on small-sized lens driving motors in a wide variety of multimedia field such as notebook personal computers, camera-equipped mobile phones, PDAs, or smart toys, and even for surveillance cameras or image input devices such as information terminals of video tape recorders.

The camera module includes a lens driving motor. Such lens driving motor may perform auto focusing or optical image stabilization. Conventional lens driving motors include additional components for the OIS (Optical Image Stabilization) configurations. Therefore, the conventional lens driving motor has rather complex internal structure and assembly flow path.

Furthermore, such structural complexity may restrict miniaturization of the lens driving motor, and may cause restriction in reliability and cost reduction of the product.

SUMMARY

An object of the present disclosure is to provide a lens driving motor of which reliability is improved in consideration of miniaturization and simplification.

In order to achieve at least the above object, in whole or in part, and in accordance with the purposes of the present disclosure, as embodied and broadly described, and in one general aspect of the present disclosure, there is provided a lens driving motor, comprising: a mover including a magnet part; and a stator including first and second coil parts arranged facing the magnet part, wherein the stator may include: a housing accommodating the mover movably at an inner side of the housing; a base supporting the housing; and a substrate disposed at one side of the base and supporting electric power to the first coil part and the second coil part.

In some exemplary embodiments, the first coil part may be disposed at the housing and the second coil part is disposed at the substrate.

In some exemplary embodiments, the lens driving motor may further comprise: a Hall sensor part sensing a phase of the mover by being arranged at a position facing that of the magnet part.

In some exemplary embodiments, the second coil part may be arranged at an upper side of the substrate, the Hall sensor part may be arranged at a lower side of the substrate, and the base may include a Hall sensor accommodating groove accommodating the Hall sensor part.

In some exemplary embodiments, the Hall sensor part may include two Hall sensors respectively arranged at two adjacent sides of the substrate.

In some exemplary embodiments, the substrate may be an FPCB (Flexible Printed Circuit Board), the substrate may include a terminal part being supplied with electric power from an external source by being curvedly formed at at least one side surface of the substrate, and the base may include a terminal groove accommodating the terminal part at a side surface of the base.

In some exemplary embodiments, the substrate may include a first lug part electrically connected to the first coil part and a second lug part electrically connected to the second coil part.

In some exemplary embodiments, the second coil part may include four FP (Fine Pattern) coils each individually applied with electric power.

In some exemplary embodiments, the mover may further include a bobbin provided with the magnet part and internally accommodating a lens unit, wherein the lens driving motor may further comprise: an upper spring connecting an upper surface of the housing and an upper surface of the bobbin; and a lower spring connecting a lower surface of the housing and a lower surface of the bobbin.

In some exemplary embodiments, the upper spring and the lower spring may each include an outer part coupled to the housing, an inner part coupled to the bobbin, and a connecting part connecting the outer part and the inner part.

In some exemplary embodiments, a stepped part may be provided by being depressedly formed at an upper surface of the housing in an area overlapped with the connecting part.

In some exemplary embodiments, a fixing piece may be provided by being protrusively formed at an upper surface of the bobbin, and the inner part may include a curved part so curved as to encase an outer surface and both lateral surfaces of the fixing piece.

In some exemplary embodiments, each of the upper spring and the lower spring may be an integrally formed leaf spring.

In some exemplary embodiments, the mover may further include a bobbin provided with the magnet part and internally accommodating a lens unit, the bobbin may include a rotation prevention part protrusively formed from an outer circumferential surface, and the housing may be disposed spaced apart from the outer circumferential surface of the bobbin and the rotation prevention part.

In another general aspect of the present disclosure, there is provided a lens driving motor, comprising: a mover including a bobbin fixing a lens unit, and a magnet part arranged at the bobbin; and a stator including a first coil part and a second coil part each arranged facing the magnet part, a housing including an upper surface having an open center and a support part having the first coil part arranged at an outer surface, a base supporting the housing and having at a center thereof a through-hole corresponding to the lens unit, and a substrate disposed at an upper surface of the base and applying electric power to the first coil part and the second coil part.

In some exemplary embodiments, the lens driving motor may further comprise: a Hall sensor part sensing a phase of the mover by being arranged at a position facing that of the magnet part.

In some exemplary embodiments, the magnet part may include four magnets arranged at equal intervals at an outer surface of the bobbin, and the bobbin may include, on an outer surface thereof, magnet grooves for each of the magnets to be mounted at.

According to an exemplary embodiment of the present disclosure, the housing is fixed and only the bobbin is driven in all directions. Therefore, an improved lens driving motor or a camera module may be implemented wherein its internal structure is simplified and miniaturized, and its reliability is enhanced.

DETAILED DESCRIPTION

Hereinafter, exemplary embodiments of the present disclosure will be described in detail with reference to the accompanying drawings.

Unless defined otherwise herein, all technical and scientific terms used herein have the same meaning as commonly understood by one of ordinary skill in the art to which this invention belongs. In a case when a term used herein conflicts with the customary meaning of the corresponding term, the meaning of the term defined herein shall supersede the customary meaning.

However, the terms mentioned herein are used merely for description of a particular exemplary embodiment. Thus, they are not intended to limit the scope of the present disclosure. Therefore, the definition of the terms shall be made based on the overall contents of the present disclosure. The same reference numbers are used throughout the present disclosure to refer to the identical elements of an exemplary embodiment.

Hereinafter, exemplary embodiments will be described with reference to enclosed drawings.

Figure 1:
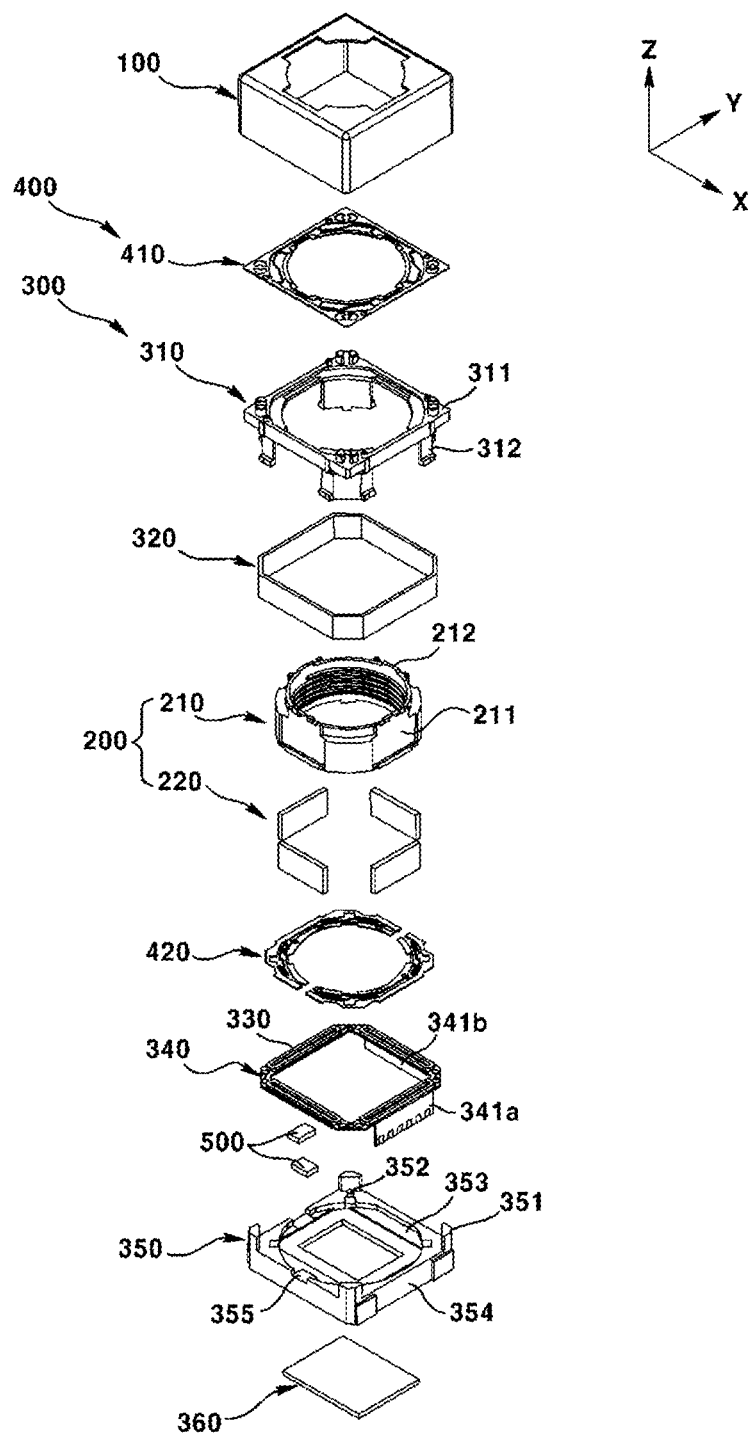
FIG. 1 is an exploded perspective view of a lens driving motor according to an exemplary embodiment of the present disclosure.
Figure 2:
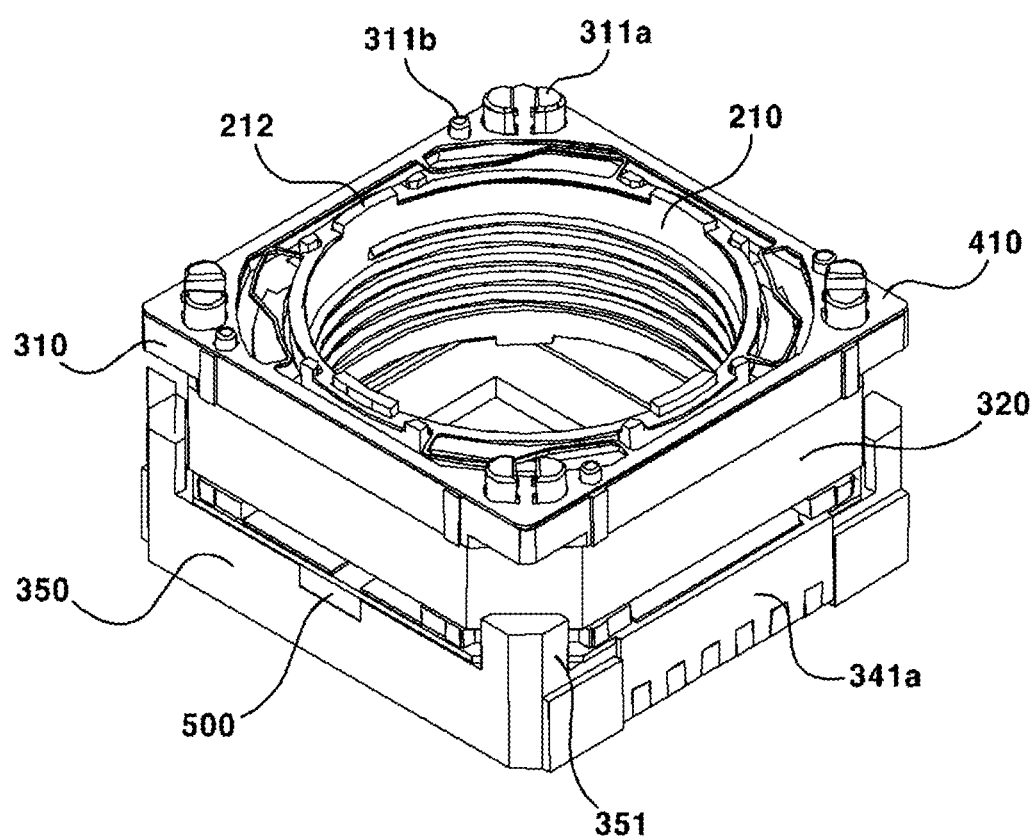
FIG. 2 is a view where a cover can is removed from a lens driving motor according to an exemplary embodiment of the present disclosure.
Figure 3:
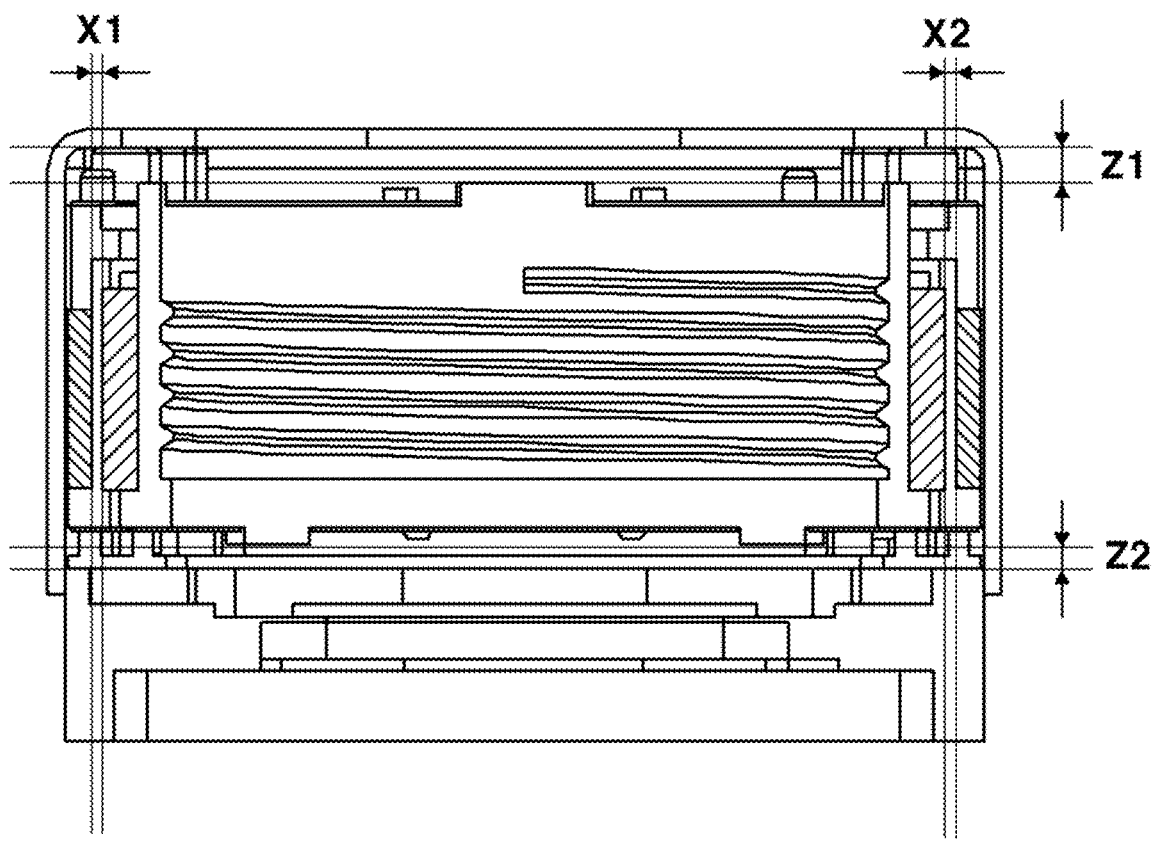
FIG. 3 is a lateral sectional view of a lens driving motor according to an exemplary embodiment of the present disclosure.
Figure 4:
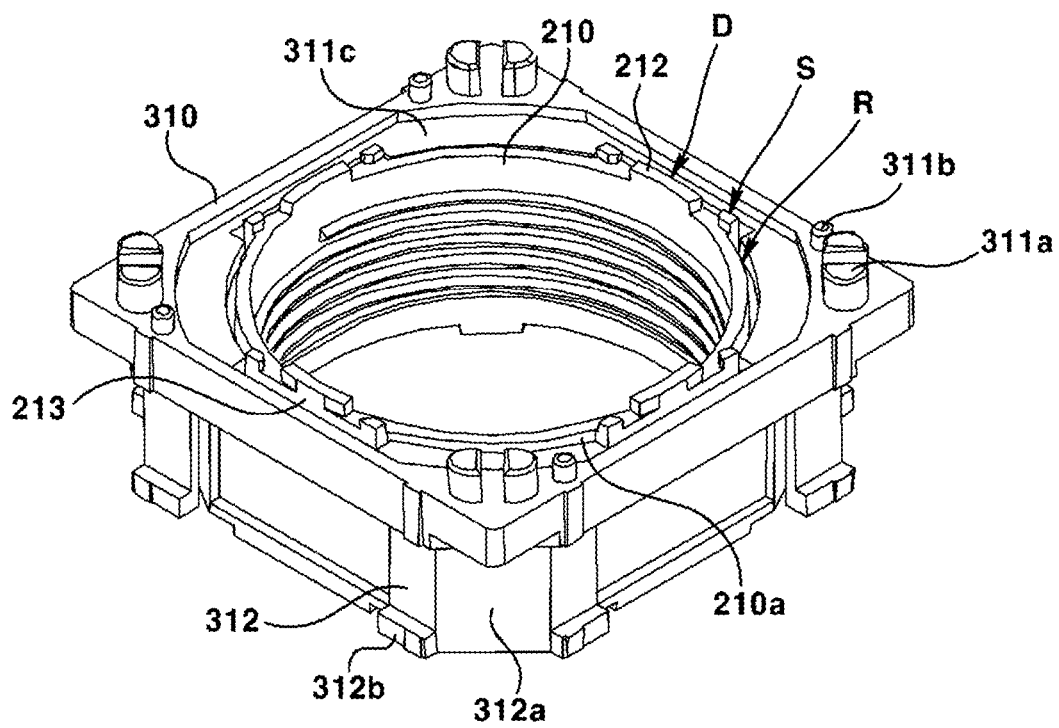
FIG. 4 is view illustrating coupled state of a housing and a bobbin of a lens driving motor according to the present disclosure from the top.
Figure 5:
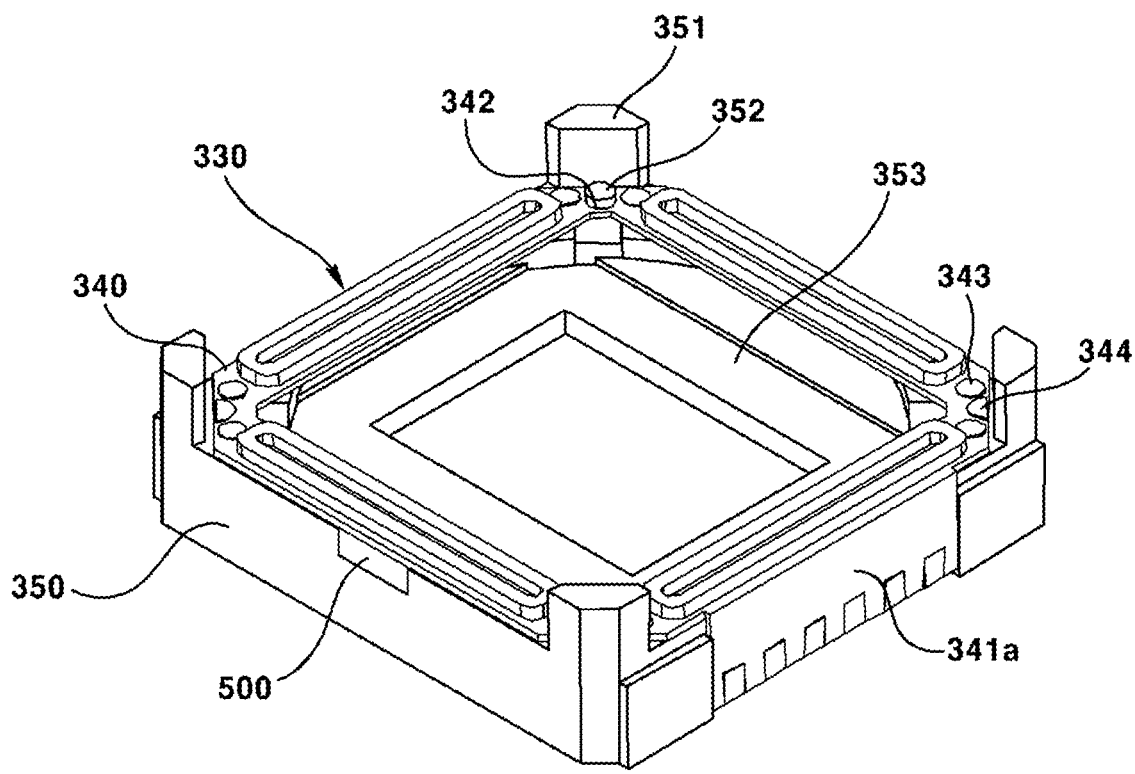
FIG. 5 is a perspective view illustrating coupled state of a base and a second coil part of a lens driving motor according to an exemplary embodiment of the present disclosure.
Figure 6:
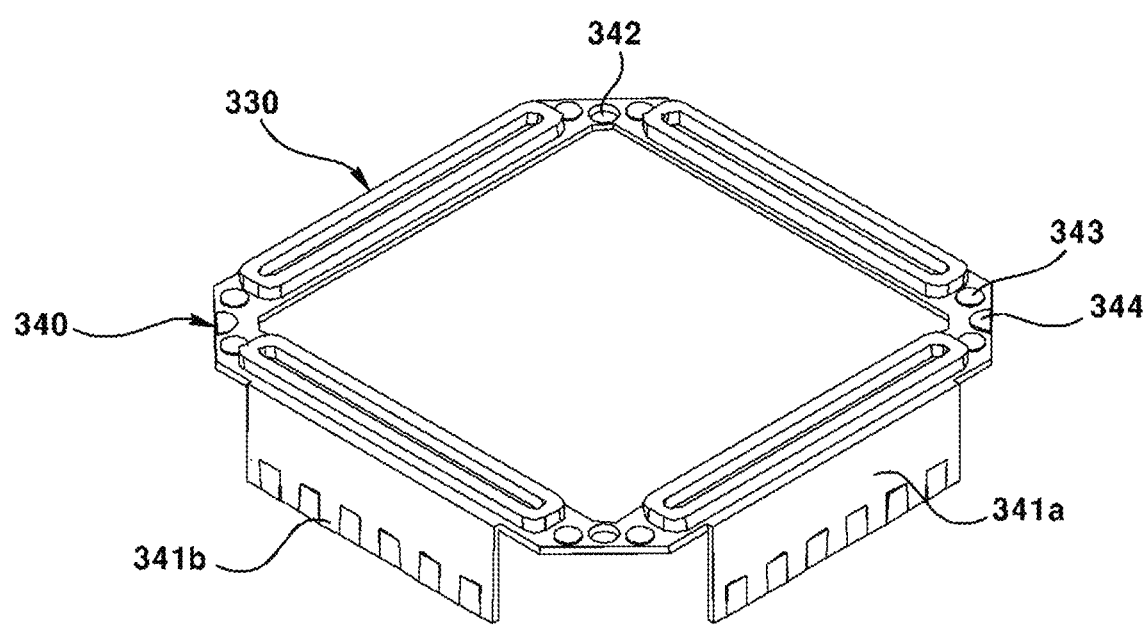
FIG. 6 is a perspective view illustrating coupled state of a substrate and a second coil part of FIG. 5.
Figure 7:
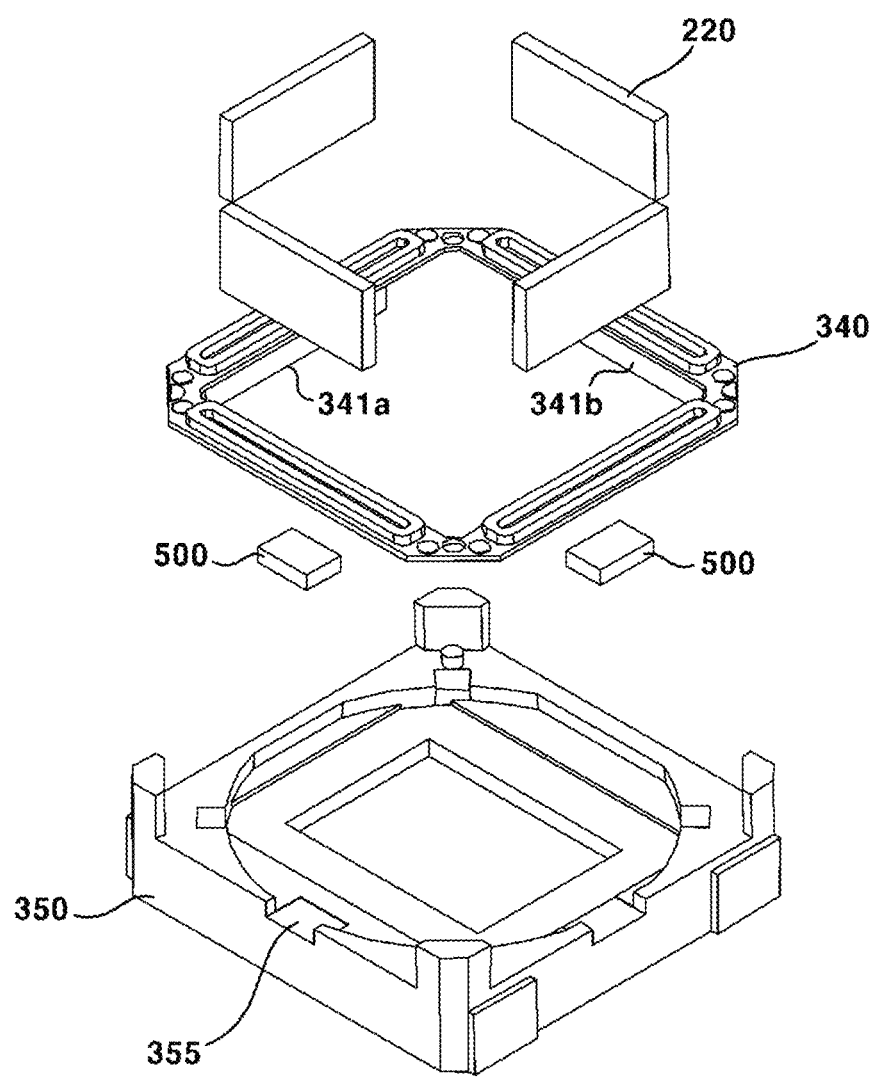
FIG. 7 is a view illustrating a magnet part, a Hall sensor part, a substrate, and a base according to an exemplary embodiment of the present disclosure.
Figure 8:
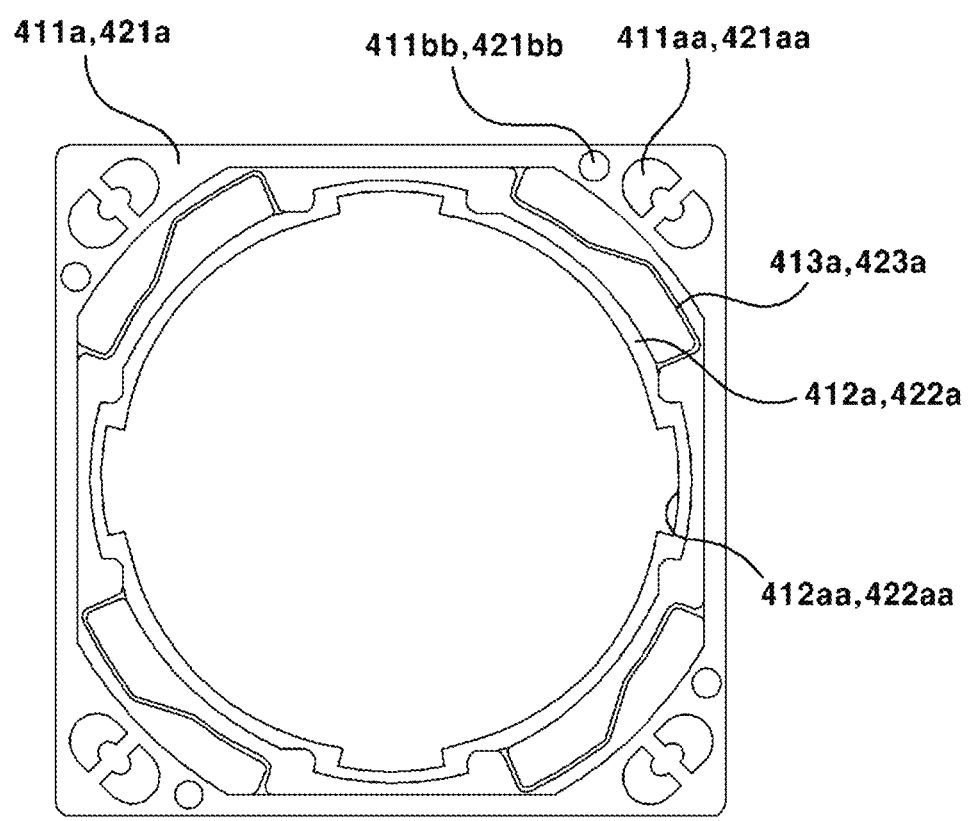
FIG. 8 is an upper view illustrating an elastic unit according to an exemplary embodiment of the present disclosure.
Figure 9:
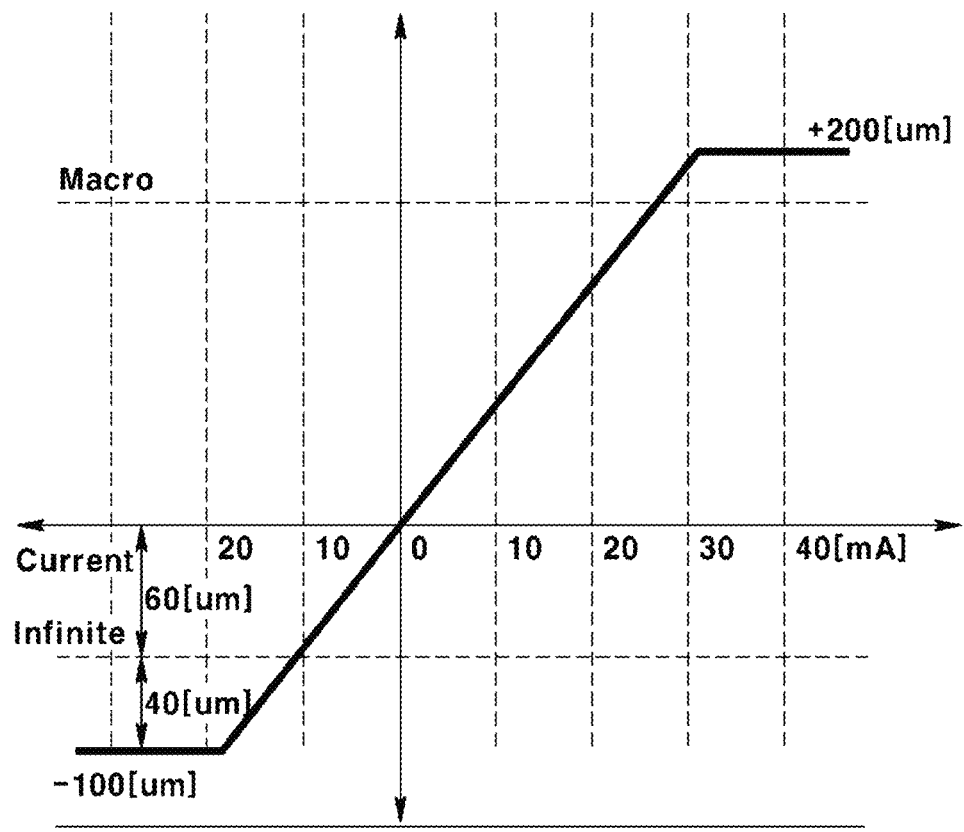
FIG. 9 is a graph schematically illustrating displacement depending on change in current applied to a first coil part of a lens driving motor according to an exemplary embodiment of the present disclosure.
Figure 10:
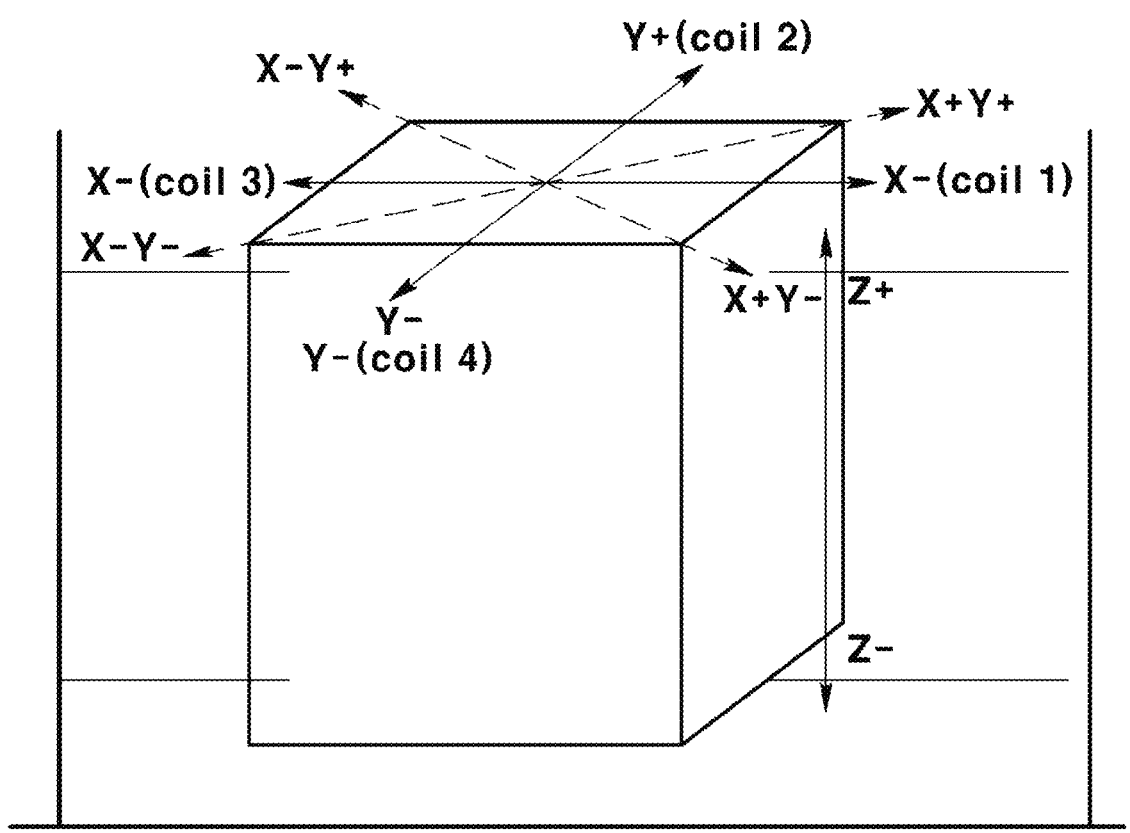
FIG. 10 is a view illustrating a moving route of a lens driving motor according to an exemplary embodiment of the present disclosure.

FIG. 1 is an exploded perspective view of a lens driving motor according to an exemplary embodiment of the present disclosure; FIG. 2 is a view where a cover can is removed from a lens driving motor according to an exemplary embodiment of the present disclosure; FIG. 3 is a lateral sectional view of a lens driving motor according to an exemplary embodiment of the present disclosure; FIG. 4 is view illustrating coupled state of a housing and a bobbin of a lens driving motor according to the present disclosure from the top; FIG. 5 is a perspective view illustrating coupled state of a base and a second coil part of a lens driving motor according to an exemplary embodiment of the present disclosure; FIG. 6 is a perspective view illustrating coupled state of a substrate and a second coil part of FIG. 5; FIG. 7 is a view illustrating a magnet part, a Hall sensor part, a substrate, and a base according to an exemplary embodiment of the present disclosure; FIG. 8 is an upper view illustrating an elastic unit according to an exemplary embodiment of the present disclosure; FIG. 9 is a graph schematically illustrating displacement depending on change in current applied to a first coil part of a lens driving motor according to an exemplary embodiment of the present disclosure; and FIG. 10 is a view illustrating a moving route of a lens driving motor according to an exemplary embodiment of the present disclosure.

Referring to FIG. 1, the lens driving motor according to an exemplary embodiment of the present disclosure may broadly include a mover (200) and a stator (300). In addition, the lens driving motor according to an exemplary embodiment of the present disclosure may further include a cover can (100), an elastic unit (400), and a Hall sensor part (500). In the exemplary embodiment, a z-axis means an optical axis, an x-axis means a direction perpendicular to the z-axis, and a y-axis means a direction perpendicular to the z-axis and the x-axis.

Referring to FIGS. 1 and 3, the cover can (100) may accommodate the mover (200) and the stator (300) (to be described hereinafter). An opening for a lens unit (not illustrated) to be exposed may be formed on an upper surface of the cover can (100). A lower surface of the cover can (100) is opened and may be closed by a base (350) (to be described hereinafter) to form an external appearance of the lens driving motor.

The cover can (100) may be formed in a shape of a rectangular parallelepiped where an opening is formed on an upper surface thereof and a lower surface thereof is opened. However, the shape of the cover can (100) may be formed in various shapes. As an example, the cover can (100) may be in a shape of a quadrangle or an octagon when viewed from the above, but not limited hereto.

The cover can (100) may be coupled to the base (350) (to be described hereinafter) with an inner lateral surface of the cover can (100) closely adhere to lateral surfaces and/or an upper surface of the base (350), such that a whole or a part of the lower surface of the cover can (100) may be closed. The cover can (100) may protect internal components from external impacts as well as inhibit penetration of external pollutants.

In addition, although it is not illustrated in the figures, the cover can (100) may additionally include a coupling piece (not illustrated) formed on a lower part of at least one surface of the cover can (100). Meanwhile, a coupling groove (not illustrated) in which the coupling piece is to be inserted may be formed on a lateral surface of the base (350) to implement stronger coupling and sealing functions.

In addition, the cover can (100) may also protect internal components of the lens driving motor from external radio wave interferences generated by such as mobile phones. Therefore, the cover can (100) may be formed of a metallic material, and may be formed in various materials including an injection molding material, an insert-injection molding material using metallic materials.

The mover (200) may include a bobbin (210) and a magnet part (220).

Referring to FIGS. 1 to 4, the bobbin (201) may include a magnet groove (211) formed on an outer circumferential surface of the bobbin (210), such that each of the magnets may be mounted in the magnet groove (211). The magnet groove (211) may be formed corresponding to a shape of the magnet, or may include an accommodating part for accommodating the magnet.

In addition, although it is not illustrated, a coupling protrusion (not illustrated) may be formed on an upper surface and/or a lower surface of the bobbin (210), where the coupling protrusion may be coupled to an inner part (412a, 422a) of an upper spring (410) and/or a lower spring (420), such that the bobbin (210) can be supported by an upper part of the base (350). The coupling protrusion may be formed in a shape of a circle, a square, or a combination thereof.

In addition, referring to FIG. 4, the bobbin (210) may include at least one rotation prevention part (213) protruded on an outer circumferential surface (210a) of the bobbin (210). Meanwhile, according to an exemplary embodiment of the present disclosure, four of the rotation prevention part (213) may be formed. Since AF (Auto Focus) operation and OIS (Optical Image Stabilization) is implemented only by motions of the bobbin (210), the rotation prevention part (213) may be formed on the bobbin (210).

That is, when the bobbin (210) moves with respect to the x-axis and the y-axis, an outer circumferential surface (210a) of the bobbin (210) and the rotation prevention part (213) may relive impacts applied to the bobbin (210) and limit a rotation angle of the bobbin (210) as well, in cooperation with an inner circumferential surface of the housing (310). For example, the rotation prevention part (213) may contact an inner surface of the housing (310) to relieve impacts applied to the x-axis and the y-axis, the outer surface of the bobbin (210) may contact the inner surface of the housing (310) to relieve impacts applied in a diagonal direction with respect to the x-axis and the y-axis, and a stating part of the rotation prevention part (213) may contact the inner surface of the housing (310) to relieve impacts with respect to the rotation.

In addition, referring to FIG. 4, a straight part (D) of the bobbin and the housing may be used for impact prevention with respect to the x-axis and/or the y-axis, a round part (R) of the bobbin and the housing may be used for impact prevention with respect to a diagonal part, and a stopper (S) disposed between the straight part (D) and the round part (R) may be used for impact prevention with respect to a rotation part.

In addition, at least two fixing pieces (212) may be formed on an upper surface or a lower surface of the bobbin (210). A curved part (412aa, 422aa) of an inner part (412a, 422a) of an upper spring (410) or a lower spring (420) may be arranged at the fixing piece (212). This fixing piece (212) may also be formed on a lower surface of the bobbin (210).

The fixing piece (212) and the curved part (412aa, 422aa) may guide the upper spring (410) or the lower spring (420) to be readily coupled with the bobbin (210), and may implement concrete fixation.

Referring to FIGS. 1 and 3, the magnet part (220) may be arranged at the bobbin (210), and may include four magnets arranged at equal intervals at an outer surface of the bobbin (210). Each of the magnets may be fixed on an outer surface of the bobbin (210) using an adhesive, or may be fixed by being inserted in the magnet groove (211) of the bobbin (210). In the latter case, the adhesive may be coated on the magnet groove (211), or may be coated on a lower surface and/or lateral surfaces of the magnet to fix the magnet.

In addition, as illustrated in the figures, the magnet part (220) may be arranged at outer surfaces of the bobbin (210). Alternatively, the magnet part (220) may be mounted at four edges of the bobbin (210) at equal intervals, in pursuit of efficient use of internal volume.

Each of the magnets may be in a shape of a prism including trigonal prism, square prism, and trapeziform pillar, and a curve may be partially included in the prism shape. In addition, the magnet may be formed during its manufacturing process such that an edge of the magnet partially includes a curved surface.

According to an exemplary embodiment of the present disclosure, N-pole and S-pole of each the magnet may be magnetized in a horizontal direction. Such structural shape of the magnet may interact with first coil part (320) and second coil part (330) by Fleming's left hand rule to move the bobbin (210). In particular, a side of the magnet directed to the bobbin (210) may be magnetized as an N-pole, and a side of the magnet directed to the first coil part (320) may be magnetized as an S-pole, and so vice versa. In this case, the first coil part (320) may be applied with electric power to move the bobbin (210) fixed to the magnet in the z-axis direction, and the second coil part (330) may be applied with electric power to move the bobbin (210) fixed to the magnet in the x-axis direction and/or the y-axis direction.

The stator (300) may include a first coil part (320), a second coil part (330), a housing (310), and a base (350).

Referring to FIGS. 1 to 3, the first coil part (320) and the second coil part (33) each may be so arrange as to correspond to the magnet part (220).

In particular, the first coil part (320) may be so arranged as to face an outer surface of the magnet part (220). The first coil part (320) may be directly wound on the housing (310), or alternatively, a pre-wound coil may be mounted to be arranged. The first coil part (320) may be an AF (Auto Focusing) coil. The first coil part (320) may be applied with electrical power to move the bobbin (210) in an optical axis direction, by interaction with the magnet part (220) arranged at the bobbin (210).

The first coil part (320) may be arranged at an outer surface of the support part (320) of the housing (310), and may be fixed by a guide rib (312b) formed on a lower end of the support part (320). The first coil part (320) may be wound on the support part (312), or alternatively, a pre-wound first coil part (320) may be mounted on the support part (312).

Alternatively, four separate first coils may be arranged on an outer surface of the housing (310) at 90 degree intervals. One end and another end of the coil wound on the first coil part (320) may be electrically connected to a first lug part (344) on the substrate (340) to be applied with electric power. Any method using a conductive material, including an adhesive such as epoxy or soldering, may be used for the electrical connection between the first coil part (320) and the first lug part (344).

Referring to FIG. 1 and FIGS. 4 to 6, the second coil part (330) may be so arranged on the substrate (340) as to correspond to a lower surface of the magnet part (220). The second coil part (330) may be an OIS (Optical Image Stabilization) coil arranged on the substrate. In addition, the second coil part (330) may be provided individually on each side on the substrate (340). In this case, the second coil part (330) may be four second coils each individually applied with electric power. In addition, the second coil part (330) may be formed as a FP (Fine Pattern) coil. In addition, one end and another end of the second coil part (330) may be electrically connected to a second lug part (343) formed on the substrate (340) to be applied with electric power. Any method using a conductive material, including an adhesive such as epoxy or soldering, may be used for the electrical connection.

Referring to FIGS. 1 to 4, the housing (310) may include an upper surface (311) having an open center, and a support part (312) formed on each edge of the upper surface (311) such that the first coil part (320) may be arranged at an outer surface of the support part (312).

In particular, a coupling protrusion (311a) for the upper spring (410) to be coupled to and/or a welding protrusion (311b) for the upper spring (410) to be fixed to may be formed on the upper surface (311) of the housing (310). The coupling protrusion (311a) may guide an outer part (411a) of the upper spring (410) to be readily arranged, when the upper spring (410) is arranged. In addition, the coupling protrusion (311a) may preserve space for the bobbin (210) to be moved in the optical axis direction. That is, the coupling protrusion (311a) may preserve space for the bobbin (210) to be moved in a direction departing from the base. In addition, an upper surface of the coupling protrusion (311a) may contact an inner surface of the cover can (100).

The coupling protrusion (311b) may be coupled to a welding groove or a welding hole of the upper spring (410), and then may be welded by being applied with heat to concretely arrange the upper spring (410). The coupling protrusion (311a) and/or welding protrusion (311b) are illustrated together in the figures. However, any one of these two may be formed on the upper surface (311) of the housing (310). In this case, the upper spring may be fixed to the housing, and at the same time, the space may be preserved such that the upper spring can be moved in an upward direction. Furthermore, those coupling protrusion (311a) and/or welding protrusion (311b) may be formed also on the lower surface of the housing (310), and may be coupled with the lower spring (420) in the same manner.

In addition, a stepped part (311c) introduced in the optical axis direction from the upper surface (311) coupled with the outer part (411a, 421a) may be formed on the upper surface (311) of the housing (311). The stepped part (311c) may be in a shape form in consideration of the inner part (412a, 422a) and the connecting part (413a, 423a) of the upper spring (410) being moved along the bobbin (210) when the bobbin (210) is moved in −Z direction that is a downward direction from the optical axis. That is, the downward direction may be the direction for the bobbin to approach the base (to be described hereinafter). In addition, a recessed part (353) of the base (340) will be described hereinafter, where the recessed part (353) may be provided for the function similar to that of the stepped part (311c).

In addition, the inner surface of the housing (310) may be formed in a shape corresponding to that of the outer surface of the bobbin (210). Further, the inner surface of the housing may be formed being spaced apart from the outer surface of the bobbin at a predetermined interval. That is, the inner surface of the first coil part (320) fixed to the housing (310) may be spaced apart from the outer surface of the magnet part fixed to the bobbin at a predetermined interval. In addition, the inner surface of the housing (310) may be formed corresponding to that of the outer circumferential surface (210a) of the bobbin (210) and the rotation prevention part (213). Such structural shape may have advantage in relieving and inhibiting impacts applied to the bobbin (210) in all direction including the rotational direction. In addition, the support part (312) of the housing (310) may be respectively formed on the lower edge of the upper surface (311), and may be integrally formed by a method such as injection molding. Here, the support part (312) may include a corresponding surface (312a) formed being spaced apart from the fixing protrusion (351; to be described hereinafter) of the base (350). In this case, the first coil part (320) may be arranged at the support part to be formed in an octagonal shape. Alternatively, the first coil part (320) may be formed in such shape that a part arranged at the corresponding surface takes a curved shape and a part arranged at the support part disposed on both sides on a lateral surface of the housing takes a straight shape.

In addition, a guide rib (312b) supporting the first coil part may be formed on a lower end of the support part (312) of the housing (310) to concretely fix mounting or winding of the first coil part.

The housing (310) is fixed even during OIS operation. Therefore, the housing (310) may be implemented a component integrated or united with the cover can (100). That is, a separating space between the cover can (100) and the housing (310) is not required, such that the volume of the product may be significantly reduced.

Referring to FIGS. 1, 5, and 6, the substrate (340) may be arranged on an upper surface of the base (350) to apply electric power to the second coil part (330). The substrate (340) may also supply electric power to the first coil part (320).

In particular, an upper surface of the substrate (340) may be formed by the first terminal part (341a) and/or the second terminal part (341b) being curved downward for being applied with electric power from an external source, such that the substrate (340) may be applied with electric power from another electric substrate (340) or an external source and may supply the electric power to the second coil part (330) and/or the first coil part (320). The Hall sensor part (500) may mounted on a lower surface of the substrate (340), and may be electrically connected to the by the first terminal part (341a) and/or the second terminal part (341b).

The first terminal part (341a) and the second terminal part (341b) may be respectively formed on sides of the substrate (340) except for the sides arranged with two Hall sensors of the Hall sensor part (500), but not limited hereto.

The substrate (340) may be implemented as a FPCB (Flexible Printed Circuit Board) having a center opened in correspondence to the lens unit and the z-axis.

In addition, the substrate (340) may include at least one coupling hole (342) or coupling groove so as to be fixed to the base (350). The base (350) may include a coupling protrusion (352) formed corresponding to the coupling hole (342) or coupling groove. The shape of the coupling hole or the coupling groove or the coupling protrusion may be circular or angular. The shape of the coupling hole or the coupling groove or the coupling protrusion may be quadrangular, if the shape is formed in an angular shape. In addition, the coupling hole or the coupling groove or the coupling protrusion may be provided in a number of least two. The coupling hole or the coupling groove or the coupling protrusion may be arranged at the edge part.

In addition, a second lug part (343) electrically connected with each coil of the second coil part (330) and a first lug part (344) electrically connected with each coil of the first coil part (320) may be formed on an upper surface of the substrate (340). At least one of the second lug part (343) or the first lug part (344) may be formed on an upper surface of the substrate (340). A plurality of the second lug part (343) may be formed to be connected with each of the second coil. That is, since the coil includes one end and another end, each of the soldering parts may include two soldering points as a pair. In addition, when each two of the four second coils are electrically connected in the substrate, two of the second coils may form a pair such that two soldering points may form a pair.

Referring to FIGS. 1 to 3 and 5, the base (350) may support the mover (200), and may be spaced apart from a lower surface of the bobbin (210) in the center at predetermined interval. In particular, the base (350) may include a recessed part (353) introduced downward so as to support the housing (310) and to be spaced apart from a lower surface of the bobbin (210) in the center at predetermined interval. A through-hole may be formed in the center of the recessed part (353) in correspondence to the lens unit. That is, the recessed part (353) may preserve a space for the bobbin to be moved in a downward direction. Alternatively, the recessed part may be excluded from essential components, when a space for the bobbin to be moved in a downward direction is provided without the recessed part according to its design specification.

In addition, a first terminal groove (354) accommodating the first terminal part (341a) and a second terminal groove (not illustrated) accommodating the second terminal part (341b) may be formed on one surface of the base (350). The terminal groove may be formed in a number corresponding to that of the terminal parts of the substrate (340). The first terminal groove (354) and/or the second terminal groove may be formed in a depth of the terminal groove (354), such that the terminal part (341) may avoid being protruded outwardly. If there are provided two of the terminal parts (341), the terminal groove (354) may be formed on two lateral surfaces of the base. In this case, two of the terminal grooves (354) may be respectively formed on surfaces opposite to each other.

In addition, a fixing protrusion (351) may be formed on the base (350) by being respectively protruded on an upper edge to contact an inner surface of the cover can (100) or an outer surface of the housing (310). The fixing protrusion (351) may guide the cover can (100) and/or the housing (310) to be readily coupled and as well as to be concretely fixed after being coupled. In the case that the fixing protrusion is formed to contact the outer surface of the housing, the first coil part may be arrange at a position spaced apart from the contacting surface at a predetermined interval, such that the outer surface of the housing may avoid interrupting the first coil part.

In addition, a coupling hole (342) of the substrate (340) and/or a coupling protrusion (352) corresponding to the coupling hole may be formed on an upper surface of the base (350). Further, there may be formed on the upper surface of the base (350) a Hall sensor accommodating groove (355) for accommodating the Hall sensor part (500) arranged at a lower side of the substrate (340).

In addition, although it is not illustrated, a coupling groove for the coupling piece of the cover can (100) may be formed on the base (350). The coupling groove may be formed, in a shape corresponding to the length of the coupling piece, locally on an outer surface of the base (350), or alternatively, may be formed entirely on the outer surface of the base (350) such that a predetermined part of the lower end of the cover can (100) including the coupling piece can be inserted in the coupling groove.

In addition, the base (350) may function as a sensor holder protecting the image sensor (not illustrated, to be described hereinafter). In this case, a protrusion may be formed along a lateral surface of the base (350). In addition, the base (350) may be provided in order to dispose the filter (360).

Referring to FIGS. 1 to 3 and 8, the elastic unit (400) may include an upper spring (410) and a lower spring (420). The later spring may not be provided, because only the bobbin (210) excluding the housing (310) is moved during AF operation and/or OIS operation.

The upper spring (410) and the lower spring (420) may be formed as separate springs arranged on each side of the housing (310). Alternatively, the upper spring (410) and the lower spring (420) may be implemented as a leaf spring in a shape where a single board material is bent and cut in consideration of production efficiency.

Therefore, an end and another end of the upper spring (410) may be respectively fixed to an upper surface (311) of the housing (310) and an upper surface of the bobbin (210). An end and another end of the lower spring (420) may be respectively fixed to a lower surface of the housing (310) and a lower surface of the bobbin (210).

Here, the upper spring (410) may include: an outer part (411a) formed with a coupling groove (411aa) disposed on an upper surface (311) of the housing (310) and corresponding to the coupling protrusion (311a) and/or a welding groove (411bb) corresponding to the welding protrusion (311b); an inner part (412a) fixed on an upper surface of the bobbin (210); and a connecting part (413a) connecting the outer part (411a) and the inner part (412a). The inner part (412a) may be formed in a broadly circular shape, and the outer part (411a) may be formed in a broadly rectangular shape.

That is, the upper spring (410) may be coupled to an upper surface of the housing (310) and an upper surface of the bobbin (210) to support the bobbin (210), and may provide returning force by a structural shape of the stepped part (311c) of the housing (310) and the recessed part (353) of the base (350), when the bobbin (210) is moved upward as well as downward based on the z-axis of the bobbin (210). In addition, the connecting part (413a) of the upper spring (410) may be formed by being bent so as to have the same elastic force. This is because of omnidirectional driving of the bobbin (210) where the lateral spring is not required. Here, the omnidirection of the bobbin may refer to the vertical direction (z-axis direction) and/or the horizontal direction (x-axis horizontal direction and/or y-axis horizontal direction). In addition, the upper spring (410) and the lower spring (420) may be formed as a single leaf spring to have the same thickness.

In addition, the first coil part (320) may be directly soldered to the substrate (340), such that the upper spring (410) and the lower spring (420) may not be required to be electrically connected to the first coil part (320). Therefore, the upper spring (410) and the lower spring (420) may be implemented as a single plate spring such that there may be obtained advantages such as assembly simplification, durability reinforcement, and reduction of product cost. Therefore, the lower spring (420) may also be formed in the same manner as that of the upper spring (410). Alternatively, the first coil may be electrically connected to the outer part of the lower spring, and the outer part of the lower spring may be electrically connected to the substrate.

That is, the lower spring (420) may be arranged at a lower surface of the housing (310), and may include an outer part (421a) arranged at a lower surface of the housing (310) and formed with a coupling groove (421aa) corresponding to the coupling protrusion (311a) or a welding groove (421bb) corresponding to the welding protrusion (311b), an inner part (422a) fixed at an upper surface of the bobbin (210), and a connecting part (423a) connecting the outer part (421a) and the inner part (422a). The inner part (422a) may be formed in a broadly circular shape in correspondence to the shape of the lower surface of the bobbin, and the outer part (421a) may be formed in a broadly rectangular shape in correspondence to the shape of the housing (310).

In addition, the lower spring (420) may be coupled at a lower surface of the housing (310) and a lower surface of the bobbin (210) to support the bobbin (210), and may provide returning force by a structural shape of the stepped part (311c) of the housing (310) and the recessed part (353) of the housing (310), when the bobbin (210) is moved upward as well as downward based on the z-axis of the bobbin (210). In addition, the connecting part (423a) of the lower spring (410) may be formed by being bent so as to have the same elastic force. This is because of omnidirectional driving of the bobbin (210) where the lateral spring is not required. Here, the omnidirection of the bobbin may refer to the vertical direction (z-axis direction) and/or the horizontal direction (x-axis horizontal direction and/or y-axis horizontal direction). In addition, the upper spring (410) and the lower spring (420) may be formed as a single leaf spring to have the same thickness.

The Hall sensor part (500) may sense a position of the mover by detecting movement of the magnet part (220). The Hall sensor may be provided in order to precisely control the lens driving motor.

The Hall sensor part (500) may be provided on a straight line with the center of the magnet part (200). The Hall sensor part (500) may include two Hall sensors respectively arranged on adjacent sides among edges of the substrate (340). There may be formed on the base (350) a Hall sensor accommodating groove for accommodating each of the Hall sensors. According to an exemplary embodiment of the present disclosure, two Hall sensors may be provided, or alternatively, more than three or four Hall sensors may be provided.

In addition, the Hall sensor (500) may be provided adjacent to the second coil part (330) rather than adjacent to the magnet part (220). The electromagnetic field of the second coil unit (330) is inconsiderable with regard to sensing the movement of the magnet unit (220), in view of the fact that the intensity of electromagnetic field generated from the magnet is hundreds of times larger than that of the electromagnetic field generated from the coil.

Meanwhile, the adhesive described in the exemplary embodiment of the present disclosure may be implemented as thermo-hardening epoxy or UV (Ultraviolet) epoxy, and may be hardened by exposure of heat or UV. Here, the adhesive may be hardened by being moved to an oven or directly applied with heat, when using the thermos-hardening epoxy. The adhesive may be hardened by being applied with UV, when using the UV epoxy.

In addition, the adhesive may be an epoxy where the thermo-hardening and the UV hardening may be mixedly used. The adhesive may be an epoxy where both of the thermo-hardening and the UV hardening are available such that any one of those may be selected to be used in hardening. The adhesive is not limited to the epoxy, and therefore, the adhesive may be substitute by any adherable material.

In the lens driving motor including such structure according to an exemplary embodiment of the present disclosure, only the bobbin (210) fixed with the lens unit may be moved in all directions including the x, y, and z-axis.

Referring to FIG. 3, the bobbin (210) according to an exemplary embodiment of the present disclosure may be moved upwards and downward in z-axis direction, as well as may be moved in the horizontal directions. That is, according to an exemplary embodiment of the present disclosure, the bobbin (210) may be moved in the vertical direction and/or the horizontal direction from the reference position. Therefore, a lower end of the bobbin (210) may be arranged being spaced apart from the base (350), and the base (350) may include the recessed part (353) in order to preserve a separating space.

In particular, according to an exemplary embodiment of the present disclosure, when a driving signal is individually applied to each of the second coil, a predetermined part of a lower end of the bobbin (210) may be moved upward, and the part facing the predetermined part based on the optical axis may be moved downward. Therefore, it is required a spatial margin to the lower direction from the reference position. Therefore, a space for being moved in the vertical direction and/or the horizontal direction may be provided between the lower end of the bobbin (210) and the base (350).

Hereinafter is described a movement control of the bobbin in the horizontal direction. TABLE 1 describes a table when four of the second coils are each individually driven. Here, Coil 1 and Coil 3 described in the following TABLE 1 are second coils arranged facing each other on the x-axis, while Coil 2 and Coil 4 are second coils arranged facing each other on the y-axis.

TABLE 1

| Coil 4 | Coil 3 | Coil 2 | Coil 1 | Output |
|---|---|---|---|---|
| 0 | 0 | 0 | 0 | 0 degree |
| 0 | 0 | 0 | 1 | +X |
| 0 | 0 | 1 | 0 | +Y |
| 0 | 0 | 1 | 1 | +X, +Y |
| 0 | 1 | 0 | 0 | −X |
| 0 | 1 | 0 | 1 | 0 degree(+X, −X) |
| 0 | 1 | 1 | 0 | −X, +Y |
| 0 | 1 | 1 | 1 | +X, −X, +Y |
| 1 | 0 | 0 | 0 | −Y |
| 1 | 0 | 0 | 1 | +X, −Y |
| 1 | 0 | 1 | 0 | 0 degree(+Y, −Y) |
| 1 | 0 | 1 | 1 | +X, +Y, −Y |
| 1 | 1 | 0 | 0 | −X, −Y |
| 1 | 1 | 0 | 1 | +X, −X, −Y |
| 1 | 1 | 1 | 0 | −X, +X, −Y |
| 1 | 1 | 1 | 1 | 0 degree(+X, −X, +Y, −Y) |

In the above TABLE 1, variables indicated as 0 and 1 refer to ON and OFF of the applied control signal, respectively. However, the variable may also refer to difference in input voltage of the applied control signal. Furthermore, the intensity of the control signal may be variously set in order to control the limit of moving distance in the horizontal direction.

Referring to FIG. 9, movement in the horizontal direction for trembling compensation may be controlled, by individually controlling the voltage applied to the second coil, as described in the TABLE 1. In addition, the horizontal movement and the vertical movement may be simultaneously controlled. For example, when output of the mover is performed as −Y, +X, −X, the mover may independently apply electric power to the first coil to be moved upward or downward while being moved to any position in the −Y axis. That is, the bobbin may be moved in an upward direction when the current is applied to the first coil in the forward direction, and the bobbin may be moved in a downward direction when the current is applied to the first coil in the reverse direction. The moving position of the bobbin may vary depending on the amount of current of the first coil.

In addition, in the above TABLE, when output of the mover is performed as −Y, +X, −X, the mover may be horizontally moved in the diagonal direction.

According to an exemplary embodiment of the present disclosure, applied level of electric power to each coil may be adjusted in order to perform AF and OIS operations simultaneously.

Meanwhile, coils of the second coil part (330) may be controlled in pairs, as described in the below TABLE 2.

TABLE 2

| Coil 1 + 3 | Coil 2 + 4 | Output |
|---|---|---|
| 0 | 0 | 0 degree |
| 0 | + | +Y |
| 0 | − | −Y |
| + | 0 | +X |
| − | 0 | −X |
| + | + | +X, +Y |
| − | + | −X, +Y |
| − | − | −X, −Y |
| + | − | +X, −Y |

The description of TABLE 2 is the same as that of TABLE 1. There is an advantage in that the driving power may be increased when two coils facing each other are controlled in a pair.

The moving distance of the lens driving motor in the vertical direction and/or in the horizontal direction according to an exemplary embodiment of the present disclosure may be limited to the separating space between X1 and X2 (between the bobbin (210) and the housing (310)) and/or the separating space between Z1 and Z2 (between the bobbin (210) and the housing (310)). The separating space may be so implemented as to have a horizontal moving distance of around 50 um~200 um. In addition, the separating space may be so implemented as to have a vertical moving distance of around 50 um~400 um.

In addition, according to an exemplary embodiment of the present disclosure, a recessed part (353) may be formed on the housing (310), such that there may be reserved a moving space in the vertical direction and/or the horizontal direction during OIS operation.

In particular, referring to FIG. 3, according to an exemplary embodiment of the present disclosure, the bobbin may be moved in Z1 direction (upward direction) based on the z-axis and in Z2 direction as well. Referring to FIG. 9, an exemplary embodiment for bi-directional AF operation may be appreciated.

In this exemplary embodiment, it may be designed such that the consumed value of voltage may be minimized in the range of 50 cm~1 m that is the distance where the most of user take a photograph of a subject. Here, it may be preferable for efficient use of electric power to design the upward moving distance (Z1) of the bobbin is longer that the downward moving distance (Z2) of the bobbin (210), but not limited hereto. As described herein, the current value or displacement illustrated in FIG. 9 merely shows an exemplary embodiment, and therefore the design may be different depending on weight and environment of each component.

Meanwhile, the lens driving device according to an exemplary embodiment of the present disclosure may be mounted in a camera module. The camera module may be provided in in a wide variety of multimedia field such as notebook personal computers, camera-equipped mobile phones, PDAs, or smart toys, and even for surveillance cameras or image input devices such as information terminals of video tape recorders.

To summarize, when the lens driving motor according to an exemplary embodiment of the present disclosure is provided in the camera module, the camera module may further include a lens unit, a filter, a printed circuit board, an image sensor, etc.

A lens unit (not illustrated in the figures) may be coupled to the bobbin to be assembled as the camera module. The lens unit may be a lens barrel, but not limited hereto. Therefore, any holder structure which is able to support a lens may be included.

The lens unit may be mounted at an upper side of the base (350), and may be arranged at a position corresponding to that of the filter (360) or the image sensor. The lens unit may include at least one lens (not illustrated in the figures).

The bobbin (210) may be coupled to the lens unit to fix the lens unit. A screw thread coupling method to form a screw thread respectively on an inner circumferential surface of the bobbin (210) and on an outer circumferential surface (210a) of the lens unit may be used as a coupling method between the lens unit and the bobbin (210). Alternatively, the bobbin (210) and the lens unit may be couple with each other using a non-screw thread coupling method using an adhesive. Of course, the adhesive may also be used after the screw coupling for more concrete mounting with each other.

The filter (360) may be mounted on a through-hole formed in the center of the base (350). In addition, the filter (360) may be formed of, for example, a film material or a glass material. Also, the filter (360) may be formed by which a kind of infrared cut-off coating material is arranged on a flat optical filter such as a cover glass for image plane protection. In addition, a separate sensor holder may be further disposed at a lower part of the base (350).

It will be apparent that, when the filter (360) is arranged on an outside of the lens, the filter (360) may be coated on the lens surface to block infrared light, without separately configuring the filter (360).

The printed circuit board (not illustrated in the figures) may include an image sensor (not illustrated in the figures) mounted on a center part of an upper surface of the printed circuit board. Various elements (not illustrated in the figures) for driving the camera module may be mounted on the printed circuit board.

The image sensor (not illustrated in the figures) may be mounted on the center part of an upper surface of the printed circuit board, such that the image sensor can be arranged along the optical axis direction with at least one lens (not illustrated in the figures) accommodated in the lens unit. The image sensor may convert optical signals of the subject incident through the lens into electric signals.

As described in the above, in the lens driving motor and/or the camera module according to an exemplary embodiment of the present disclosure, the bobbin may perform tilting and moving in the height direction. Thereby, there may be obtained advantages such as simple structure, miniaturization, reduction of product cost, enhancement of efficiency in the applied electric power, etc.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims and equivalents thereof.

The invention claimed is:

1. A lens driving motor, comprising:
a base;
a housing disposed on the base;
a bobbin disposed in the housing;
a magnet;
a first coil facing the magnet and configured to move the bobbin in an optical axis direction;
a second coil part comprising a substrate disposed on an upper surface of the base and a second coil facing the magnet and configured to move the bobbin in a direction perpendicular to the optical axis direction;
an upper spring connecting an upper portion of the housing and the bobbin; and
a lower spring connecting a lower portion of the housing and the bobbin,
wherein an upward moving distance of the bobbin is greater than a downward moving distance of the bobbin,
wherein the lower spring comprises two springs spaced apart from each other, and
wherein the two springs of the lower spring electrically connect the first coil and the substrate.

2. The lens driving motor of claim 1, wherein the upward moving distance of the bobbin is at least twice as much as the downward moving distance of the bobbin.

3. The lens driving motor of claim 1, wherein the second coil is formed on the substrate as a pattern coil.

4. The lens driving motor of claim 1, comprising:
a Hall sensor disposed among the magnet, the base and sensing the magnet.

5. The lens driving motor of claim 4, wherein the Hall sensor is disposed below the substrate, and
wherein the base comprises a Hall sensor accommodating groove accommodating the Hall sensor.

6. The lens driving motor of claim 4, wherein the Hall sensor comprises two Hall sensors disposed on a lower surface of the substrate.

7. The lens driving motor of claim 1,
wherein the substrate comprises a terminal part being supplied with electric power from an external source and the terminal part extends from at least one side surface of the substrate, and
wherein the base comprises a terminal groove accommodating at least a portion of the terminal part at a side surface of the base.

8. The lens driving motor of claim 1, wherein the substrate comprises a first terminal part electrically connected to the first coil and a second terminal part electrically connected to the second coil.

9. The lens driving motor of claim 1, wherein the second coil comprises four coils.

10. The lens driving motor of claim 1, wherein the upper spring and the lower spring each comprises an outer part coupled to the housing, an inner part coupled to the bobbin, and a connecting part connecting the outer part and the inner part.

11. The lens driving motor of claim 10, wherein a stepped part is provided by being depressedly formed at an upper surface of the housing in an area overlapped with the connecting part of the upper spring.

12. The lens driving motor of claim 10, wherein a fixing piece is provided by being protrusively formed at an upper surface of the bobbin, and
wherein the inner part comprises a curved part corresponding to the fixing piece.

13. The lens driving motor of claim 1, wherein the upper spring is an integrally formed leaf spring.

14. The lens driving motor of claim 1, wherein the magnet comprises four magnets spaced apart from each other,
wherein the first coil is formed as a single coil, and
wherein the second coil comprises four coil regions spaced apart from each other.

15. The lens driving motor of claim 1, wherein the bobbin is movable in the optical axis direction, and
wherein the bobbin is movable in a direction perpendicular to the optical axis direction or is tiltable.

16. A camera module, comprising:
a printed circuit board;
an image sensor disposed on the printed circuit board;
the lens driving motor of claim 1 disposed on the printed circuit board; and
a lens coupled to the bobbin of the lens driving motor.

17. A mobile phone, comprising the camera module of claim 16.

18. A lens driving motor, comprising:
a base;
a housing disposed on the base;
a bobbin disposed in the housing;
a magnet;
a first coil facing the magnet and configured to move the bobbin in an optical axis direction;
a second coil part comprising a substrate disposed on an upper surface of the base and a second coil facing the magnet and configured to move the bobbin in a direction perpendicular to the optical axis direction; and
an upper spring connecting an upper portion of the housing and the bobbin,
wherein an upward moving distance of the bobbin is greater than a downward moving distance of the bobbin,
wherein the bobbin comprises a rotation prevention part protrusively formed from an outer circumferential surface of the bobbin, and
wherein the housing is spaced apart from the outer circumferential surface of the bobbin and the rotation prevention part.

19. A lens driving motor, comprising:
a base;
a housing disposed on the base;
a bobbin disposed in the housing;
a magnet;
a first coil facing the magnet and configured to move the bobbin in an optical axis direction;
a second coil part comprising a substrate disposed on an upper surface of the base and a second coil facing the magnet and configured to move the bobbin in a direction perpendicular to the optical axis direction;
an upper spring connecting an upper portion of the housing and the bobbin; and a cover can coupled to the base and accommodating the housing;

wherein the housing is integrally formed with the cover can, and wherein an upward moving distance of the bobbin is greater than a downward moving distance of the bobbin.

\* \* \* \* \*